US012768729B2

(12) United States Patent
Rud et al.

(10) Patent No.: US 12,768,729 B2
(45) Date of Patent: Oct. 20, 2026

(54) NON-INVASIVE PROCESS FLUID TEMPERATURE INDICATION

(71) Applicant: Rosemount Inc., Shakopee, MN (US)

(72) Inventors: Jason H. Rud, Chanhassen, MN (US); Steven R. Trimble, Prior Lake, MN (US)

(73) Assignee: Rosemount Inc., Shakopee, MN (US)

( * ) Notice: Subject to any disclaimer, the term of this patent is extended or adjusted under 35 U.S.C. 154(b) by 415 days.

(21) Appl. No.: 16/146,152

(22) Filed: Sep. 28, 2018

(65) Prior Publication Data

US 2020/0103293 A1 Apr. 2, 2020

(51) Int. Cl.
*G01K 17/08* (2006.01)
*G01K 1/143* (2021.01)
*G01K 13/02* (2021.01)

(52) U.S. Cl.
CPC ............. *G01K 17/08* (2013.01); *G01K 1/143* (2013.01); *G01K 13/02* (2013.01)

(58) Field of Classification Search
CPC ........ G01K 1/16; G01K 1/143; G01K 13/026; G01K 13/024; G01K 1/026; G01K 1/08;
(Continued)

(56) References Cited

U.S. PATENT DOCUMENTS 4,346,864 A * 8/1982 Feller ..................... G01K 1/143 236/1 R
5,004,356 A * 4/1991 Matsui ................... A44B 19/34 383/63
(Continued)

FOREIGN PATENT DOCUMENTS

CA 2886019 A1 * 4/2014 ............. G01N 11/02
DE 102016107335 A1 10/2017
(Continued)

OTHER PUBLICATIONS

International Search Report and Written Opinion for International Patent Application No. PCT/US2019/052904, date of mailing: Jan. 8, 2020, date of filing: Sep. 28, 2018, 13 pages.
(Continued)

*Primary Examiner* — Randy W Gibson
(74) *Attorney, Agent, or Firm* — Christopher R. Christenson; Kelly, Holt & Christenson, P.L.L.C.

(57) ABSTRACT

A process fluid temperature estimation system includes a mounting assembly configured to mount the process fluid temperature estimation system to an external surface of a process fluid conduit. A sensor capsule has at least one temperature sensitive element disposed therein. Measurement circuitry is coupled to the sensor capsule and configured to detect an electrical characteristic of the at least one temperature sensitive element that varies with temperature and provide sensor capsule temperature information. A controller is coupled to the measurement circuitry and is configured to obtain a reference temperature and employ a heat transfer calculation with the reference temperature, the sensor capsule temperature information and the known thermal conductivity of the process fluid conduit to generate an estimated process fluid temperature output. The reference temperature is obtained from a reference temperature source selected from the group consisting of: a terminal temperature sensor, process communication, an electronics temperature sensor, an external ambient temperature sensor, and an estimation based on known thermal properties.

6 Claims, 4 Drawing Sheets

(58) Field of Classification Search
CPC ........ G01K 7/42; G01K 1/12; G01K 2205/00; G01K 17/08; G01K 13/02; A61F 2007/0056; A61F 2007/0095; A61F 2007/0017; A61F 2007/005; A61F 2007/0076; A61F 2007/0086; A61F 2007/0285; A61F 7/0085; A61F 7/12; G01M 3/002; G01M 3/2807; G01N 25/18; G01N 27/74
See application file for complete search history.

(56) References Cited

U.S. PATENT DOCUMENTS

| | | | | |
|---|---|---|---|---|
| 6,158,886 | A * | 12/2000 | Dutcher | G01K 1/143 374/147 |
| 6,644,848 | B1 * | 11/2003 | Clayton | E21B 43/01 73/61.62 |
| 6,824,305 | B1 * | 11/2004 | Boyd | G01K 17/00 374/15 |
| 7,246,452 | B1 * | 7/2007 | Roy | B27K 3/16 34/381 |
| 7,426,452 | B2 * | 9/2008 | Zielinski | G05B 19/4183 702/184 |
| 7,982,580 | B2 | 7/2011 | Holger et al. | |
| 8,302,491 | B2 * | 11/2012 | Stack | G01F 1/8436 73/861.356 |
| 8,337,081 | B1 * | 12/2012 | Holmberg | F24H 1/181 374/121 |
| 8,495,868 | B2 * | 7/2013 | McCoy | F01N 3/2066 60/301 |
| 9,011,608 | B2 * | 4/2015 | Amundsen | G01B 21/085 134/19 |
| 10,041,860 | B2 * | 8/2018 | Rahman | G01M 99/002 |
| 10,670,546 | B2 | 6/2020 | Rud et al. | |
| 11,237,066 | B2 | 2/2022 | Merlin | |
| 2002/0064206 | A1 * | 5/2002 | Gysling | G01K 11/3206 374/147 |
| 2011/0225950 | A1 * | 9/2011 | McCoy | F01N 3/2066 60/274 |
| 2012/0076171 | A1 * | 3/2012 | Wu | G01N 33/48785 374/E7.018 |
| 2013/0226460 | A1 * | 8/2013 | Wu | G01K 1/20 702/7 |
| 2014/0356971 | A1 * | 12/2014 | Kozlow | G01N 33/0044 436/121 |
| 2017/0069925 | A1 * | 3/2017 | Barari | G01K 1/026 |
| 2017/0212065 | A1 * | 7/2017 | Rud | G01N 25/18 |
| 2018/0003655 | A1 | 1/2018 | Rud et al. | |
| 2018/0010978 | A1 * | 1/2018 | Bailey | G01K 13/02 |
| 2018/0238741 | A1 | 8/2018 | Rud et al. | |
| 2020/0003646 | A1 * | 1/2020 | Krywyj | G01M 3/243 |
| 2020/0408580 | A1 * | 12/2020 | Gebhardt | G01K 7/427 |

FOREIGN PATENT DOCUMENTS

| | | | |
|---|---|---|---|
| JP | S59103235 | U | 7/1984 |
| JP | S61115203 | U | 7/1986 |
| JP | H04271229 | A | 9/1992 |
| JP | 2002039335 | A | 2/2002 |
| JP | 2007263636 | A | 10/2007 |
| JP | 2009297829 | A | 12/2009 |
| JP | 2011522261 | A | 7/2011 |
| JP | 5977551 | B2 * | 8/2016 |
| JP | 2018129995 | A | 8/2018 |
| KR | 20180096442 | A | 8/2018 |
| WO | 2015099933 | A1 | 7/2015 |
| WO | 2016146500 | A1 | 9/2016 |
| WO | 2017094349 | A1 | 6/2017 |
| WO | 2017131546 | A1 | 8/2017 |
| WO | 2018138880 | A1 | 8/2018 |

OTHER PUBLICATIONS

First Chinese Office Action for Chinese Patent Application No. 201910169893.5, dated Dec. 24, 2020, 3 pages including English translation.
Second Chinese Office Action for Chinese Patent Application No. 201910169893.5, dated Aug. 16, 2021, 13 pages including English translation.
European Search Report dated Jun. 21, 2022, for European Patent Application No. 19864245.6, 9 pages.
First Office Action for Canadian Patent Application No. 3114609, dated Apr. 27, 2022, 4 pages.
First Examination Report dated Feb. 10, 2022 for Indian Patent Application No. 202127012522, 6 pages including English translation.
Rejection Decision dated Apr. 7, 2022 for Chinese Patent Application No. 201910169893.5, 13 pages including English translation.
Office Action dated Apr. 19, 2022 for Japanese Patent Application No. 2021-517300, 20 pages including English translation.
Second Office Action for Japanese Application No. 2021-517300, Dated Dec. 20, 2022, 23 pages including English Translation.
Communication Pursuant to Article 94(3) EPC for European Patent App# 19864245.6, Dated Jun. 2, 2023, 4 pages.
Reexamination Decision for Chinese Patent Application No. 201910169893.5, Dated Apr. 8, 2025, 27 pages including English Translation.
CN 201910169893.5—Office Action dated Dec. 24, 2024, 18 pages.
International Preliminary Report on Patentability for International Application No. PCT/US2019/052904, dated Apr. 8, 2021, 9 Pages.

* cited by examiner

NON-INVASIVE PROCESS FLUID TEMPERATURE INDICATION

BACKGROUND

Many industrial processes convey process fluids through pipes or other conduits. Such process fluids can include liquids, gasses, and sometimes entrained solids. These process fluid flows may be found in any of a variety of industries including, without limitation, hygienic food and beverage production, water treatment, high-purity pharmaceutical manufacturing, chemical processing, the hydrocarbon fuel industry, including hydrocarbon extraction and processing as well as hydraulic fracturing techniques utilizing abrasive and corrosive slurries.

It is common to place a temperature sensor within a thermowell, which is then inserted into the process fluid flow through an aperture in the conduit. However, this approach may not always be practical in that the process fluid may have a very high temperature, be very corrosive, or both. Additionally, thermowells generally require a threaded port or other robust mechanical mount/seal in the conduit and thus, must be designed into the process fluid flow system at a defined location. Accordingly, thermowells, while useful for providing accurate process fluid temperatures, have a number or limitations.

More recently, process fluid temperature has been estimated by measuring an external temperature of a process fluid conduit, such as a pipe, and employing a heat flow calculation. This external approach is considered non-invasive because it does not require any aperture or port to be defined in the conduit. Accordingly, such non-intrusive approaches can be deployed at virtually any location along the conduit.

SUMMARY

A process fluid temperature estimation system includes a mounting assembly configured to mount the process fluid temperature estimation system to an external surface of a process fluid conduit. A sensor capsule has at least one temperature sensitive element disposed therein. Measurement circuitry is coupled to the sensor capsule and configured to detect an electrical characteristic of the at least one temperature sensitive element that varies with temperature and provide sensor capsule temperature information. A controller is coupled to the measurement circuitry and is configured to obtain a reference temperature and employ a heat transfer calculation with the reference temperature, the sensor capsule temperature information and the known thermal conductivity of the process fluid conduit to generate an estimated process fluid temperature output. The reference temperature is obtained from a reference temperature source selected from the group consisting of: a terminal temperature sensor, process communication, an electronics temperature sensor, an external ambient temperature sensor, and an estimation based on known thermal properties.

DETAILED DESCRIPTION

As set forth above, process fluid temperatures can be estimated by measuring an external temperature of a process fluid conduit, such as a pipe, and employing a heat flow calculation. Such systems generally use the pipe skin (external surface) temperature $T_{skin}$ and a reference temperature $T_{reference}$ and thermal impedance values in the heat flow calculation to infer or otherwise estimate the process fluid temperature within the conduit. This feature generally requires the thermal conductivity to be known from the process fluid to the transmitter terminals. Thus, such systems may require a transmitter terminal temperature sensor to generally be connected or as close as possible to the process fluid temperature transmitter terminals or the "cold end" of the pipe skin sensor. This relationship provides a better correlation between the measurement points in the system ($T_{skin}$, $T_{reference}$). As the process temperature rises, typically the temperature profile will change in the system causing the cold end of the sensor to rise slightly. This change is important to understand to provide a proper inference of the process temperature. For ambient and process temperatures that change slightly or not at all, direct measurements are not necessary between the skin temperature and another temperature point in the mounted assembly for a reasonable correction of the process temperature.

Figure 1:
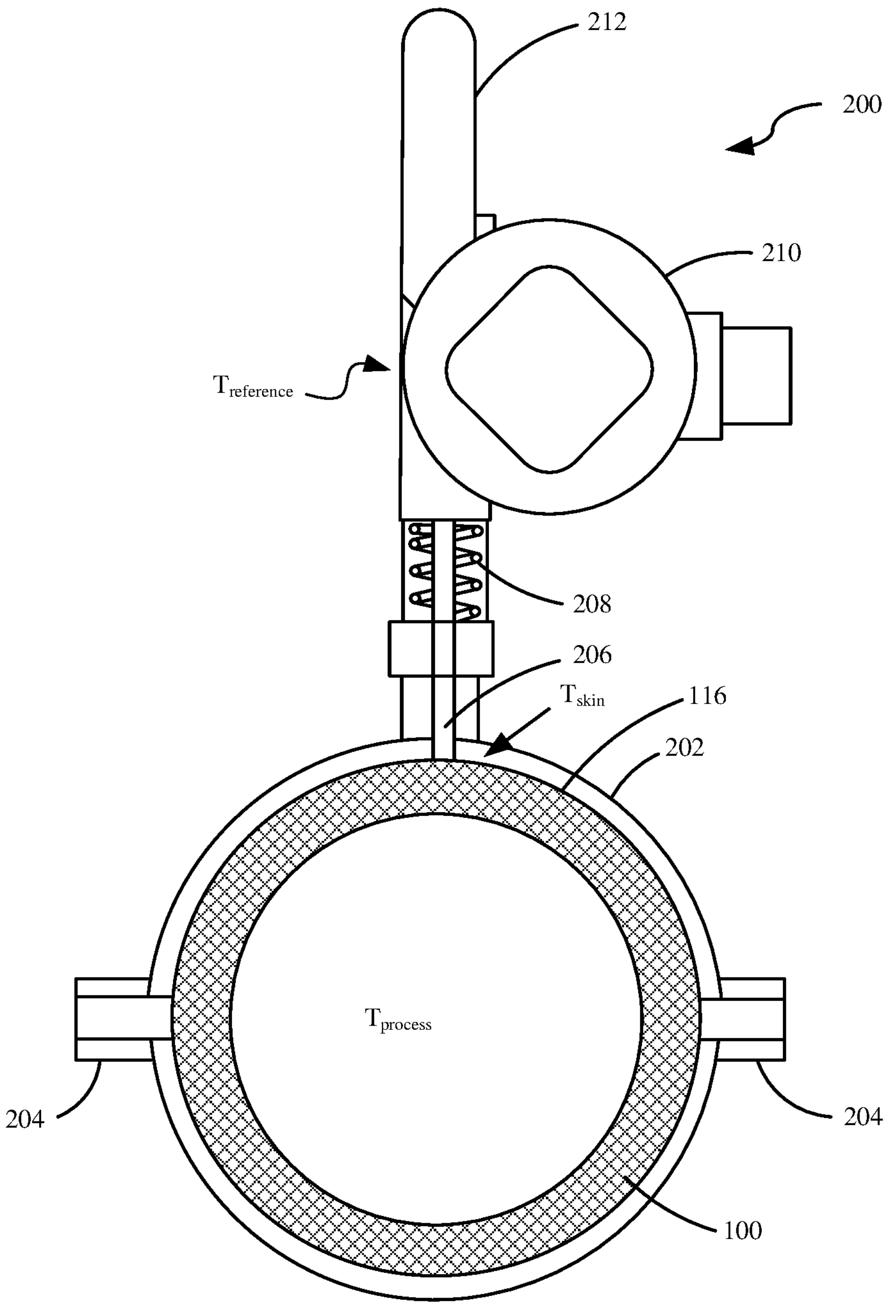
FIG. 1 is a diagrammatic view of a heat flow measurement system with which embodiments of the present invention are particularly applicable.

FIG. 1 is a diagrammatic view of a heat flow measurement system with which embodiments of the present invention are particularly applicable. As illustrated, system 200 generally includes a pipe clamp portion 202 that is configured to clamp around conduit or pipe 100. Pipe clamp 202 may have one or more clamp ears 204 in order to allow the clamp portion 202 to be positioned and clamped to pipe 100. Pipe clamp 202 may replace one of clamp ears 204 with a hinge portion such that pipe clamp 202 can be opened to be positioned on a pipe and then closed and secured by clamp ear 204. While the clamp illustrated with respect to FIG. 1 is particularly useful, any suitable mechanical arrangement for securely positioning system 200 about an exterior surface of a pipe can be used in accordance with embodiments described herein.

System 200 includes heat flow sensor capsule 206 that is urged against external diameter 116 of pipe 100 by spring 208. The term "capsule" is not intended to imply any particular structure or shape and can thus be formed in a variety of shapes, sizes and configurations. While spring 208 is illustrated, those skilled in the art will appreciate that various techniques can be used to urge sensor capsule 206 into continuous contact with external diameter 116. Sensor capsule 206 generally includes one or more temperature sensitive elements, such as resistance temperature devices (RTDs). Sensors within capsule 206 are electrically connected to transmitter circuitry within housing 210, which is configured to obtain one or more temperature measurements from sensor capsule 206 and calculate an estimate of the process fluid temperature based on the measurements from sensor capsule 206, and a reference temperature, such as a temperature measured within housing 210, or otherwise provided to circuitry within housing 210.

In one example, the basic heat flow calculation can be simplified into:

$$T_{corrected}=T_{skin}+(T_{skin}-T_{reference})*(R_{pipe}/R_{sensor}).$$

In this equation, $T_{skin}$ is the measured temperature of the external surface of the conduit. Additionally, $T_{reference}$ is a second temperature obtained relative to a location having a thermal impedance ($R_{sensor}$) from the temperature sensor that measures $T_{skin}$. $T_{reference}$ is typically sensed by a dedicated sensor within housing 210. However, $T_{reference}$ can be sensed or inferred in other ways as well. For example, a temperature sensor can be positioned external to the transmitter to replace the terminal temperature measurement in the heat transfer calculation. This external sensor would measure the temperature of the environment surrounding the transmitter. As another example, industrial electronics typically have onboard temperature measurement capabilities. This electronics temperature measurement can be used as a substitute to the terminal temperature for the heat transfer calculation. As another example, if the thermal conductivity of the system is known and the ambient temperature around the transmitter is fixed or user controlled, the fixed or user controllable temperature can be used as the reference temperature.

$R_{pipe}$ is the thermal impedance of the conduit and can be obtained manually by obtaining pipe material information, pipe wall thickness information, etc. Additionally, or alternately, a parameter related to $R_{pipe}$ can be determined during a calibration and stored for subsequent use. Accordingly, using a suitable heat flux calculation, such as that described above, circuitry within housing 210 is able to calculate an estimate for the process fluid temperature ($T_{corrected}$) and convey an indication regarding such process fluid temperature to suitable devices and/or a control room. In the example illustrated in FIG. 1, such information may be conveyed wirelessly via antenna 212.

Figure 2:
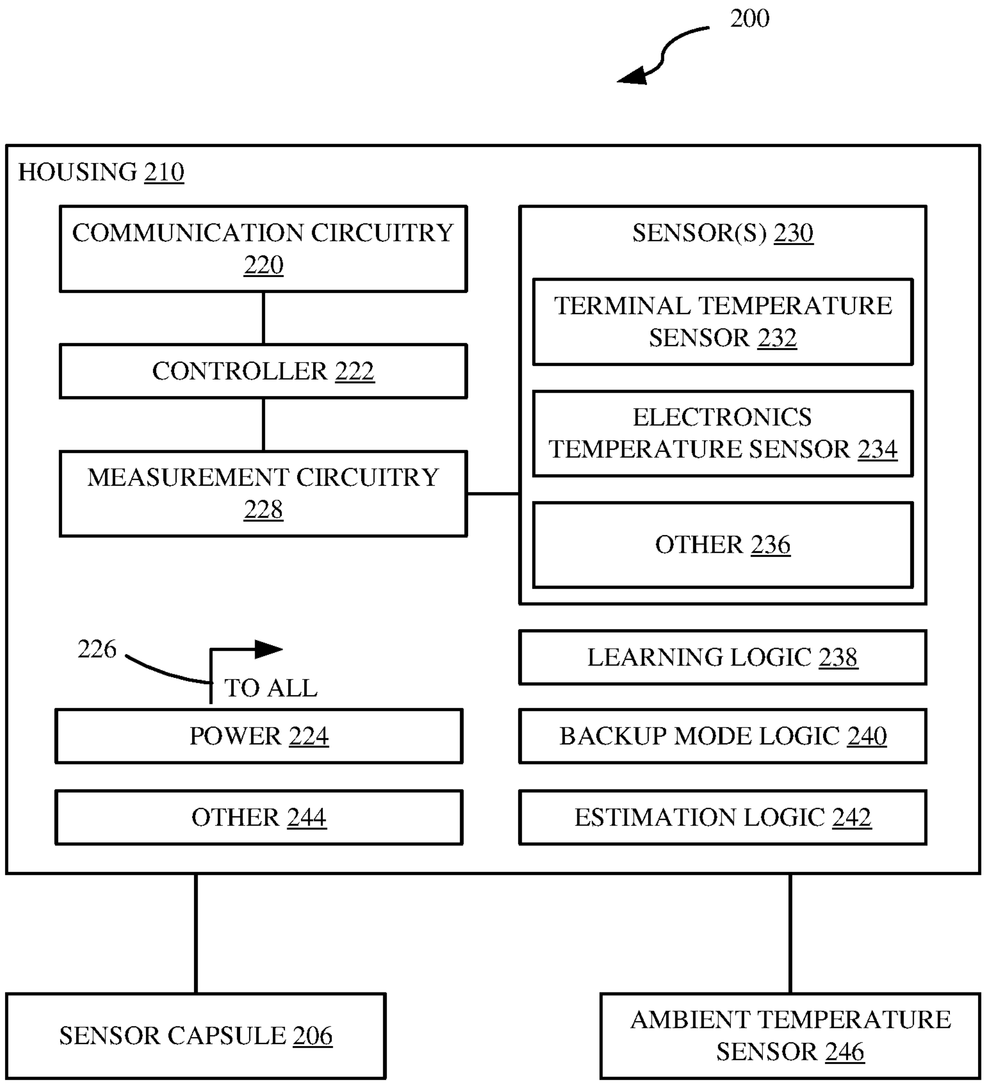
FIG. 2 is a block diagram of circuitry within a heat flow measurement system, within a heat flow measurement system, with which embodiments of the present invention are particularly applicable.

FIG. 2 is a block diagram of circuitry within housing 210 of heat flow measurement system 200, with which embodiments of the present invention are particularly applicable. System 200 includes communication circuitry 220 coupled to controller 222. Communication circuitry 220 can be any suitable circuitry that is able to convey information regarding the estimated process fluid temperature. Communication circuitry 220 allows heat flow measurement system 200 to communicate the process fluid temperature output over a process communication loop or segment. Suitable examples of process communication loop protocols include the 4-20 milliamp protocol, Highway Addressable Remote Transducer (HART®) protocol, FOUNDATION™ Fieldbus Protocol, and the WirelessHART protocol (IEC 62591).

Heat flow measurement system 200 also includes power supply module 224 that provides power to all components of system 200 as indicated by arrow 226. In embodiments where heat flow measurement system 200 is coupled to a wired process communication loop, such as a HART® loop, or a FOUNDATION™ Fieldbus segment, power module 224 may include suitable circuitry to condition power received from the loop or segment to operate the various components of system 200. Accordingly, in such wired process communication loop embodiments, power supply module 224 may provide suitable power conditioning to allow the entire device to be powered by the loop to which it is coupled. In other embodiments, when wireless process communication is used, power supply module 224 may include a source of power, such as a battery and suitable conditioning circuitry.

Controller 222 includes any suitable arrangement that is able to generate a heat-flow based process fluid temperature estimate using measurements from sensor(s) within capsule 206 and an additional reference temperature, such as a terminal temperature within housing 210. In one example, controller 222 is a microprocessor. Controller 222 is communicatively coupled to communication circuitry 220.

Measurement circuitry 228 is coupled to controller 222 and provides digital indications with respect to measurements obtained from one or more temperature sensors 230. Measurement circuitry 228 can include one or more analog-to-digital converters and/or suitable multi-plexing circuitry to interface the one or more analog-to-digital converters to temperature sensors 230. Additionally, measurement circuitry 228 can include suitable amplification and/or linearization circuitry as may be appropriate for the various types of temperature sensors employed.

Temperature sensors 230 illustratively include terminal temperature sensor 232, electronics temperature sensor 234 and can include other items as well, as indicated by block 236. Electronics temperature sensor 234 is coupled to the electronic circuitry of system 200 and is used to determine the temperature of the electronics. Typically, electronics temperature sensor 234 is used to protect the electronic circuitry from overheating. For example, when the electronics reach a certain temperature, a fan is turned on to reduce that temperature. In one embodiment, electronics temperature sensor 234 senses the reference temperature.

According to one embodiment, system 200 also includes a variety of different logic components as indicated by blocks 238-242. Each logic component provides a variety of different functions, that can be performed by controller 222. Backup mode logic 238 monitors the status of terminal temperature sensor 232, and in the event of sensor failure or malfunction, turns on a backup mode. That is, a mode where the reference temperature is received from a source other than terminal temperature sensor 232. This is an example of controller logic determining the occurrence of a reference temperature switchover event. This way in the event of sensor failure or malfunction the measurement point does not have to go completely off-line. In another example, controller 222 may receive a commend, either through local technician interaction with system 200 or via process communication, to switch to an alternate reference temperature source. Other suitable conditions for determining the occurrence of a reference temperature switchover event can be practiced in accordance with embodiments described herein.

During normal operation, information can be learned, by learning logic 238, about the correlation between the conduit skin temperature and terminal temperature measurements. If one or the other measurement points fail (terminal temperature or skin temperature sensors), the learned correlation can be applied as an additional backup mode option.

Estimation logic 242 can calculate the reference temperature with the measured skin temperature changes, if the thermal conductivity of the system is known and/or the ambient temperature around the transmitter is fixed or controlled.

Figure 3:
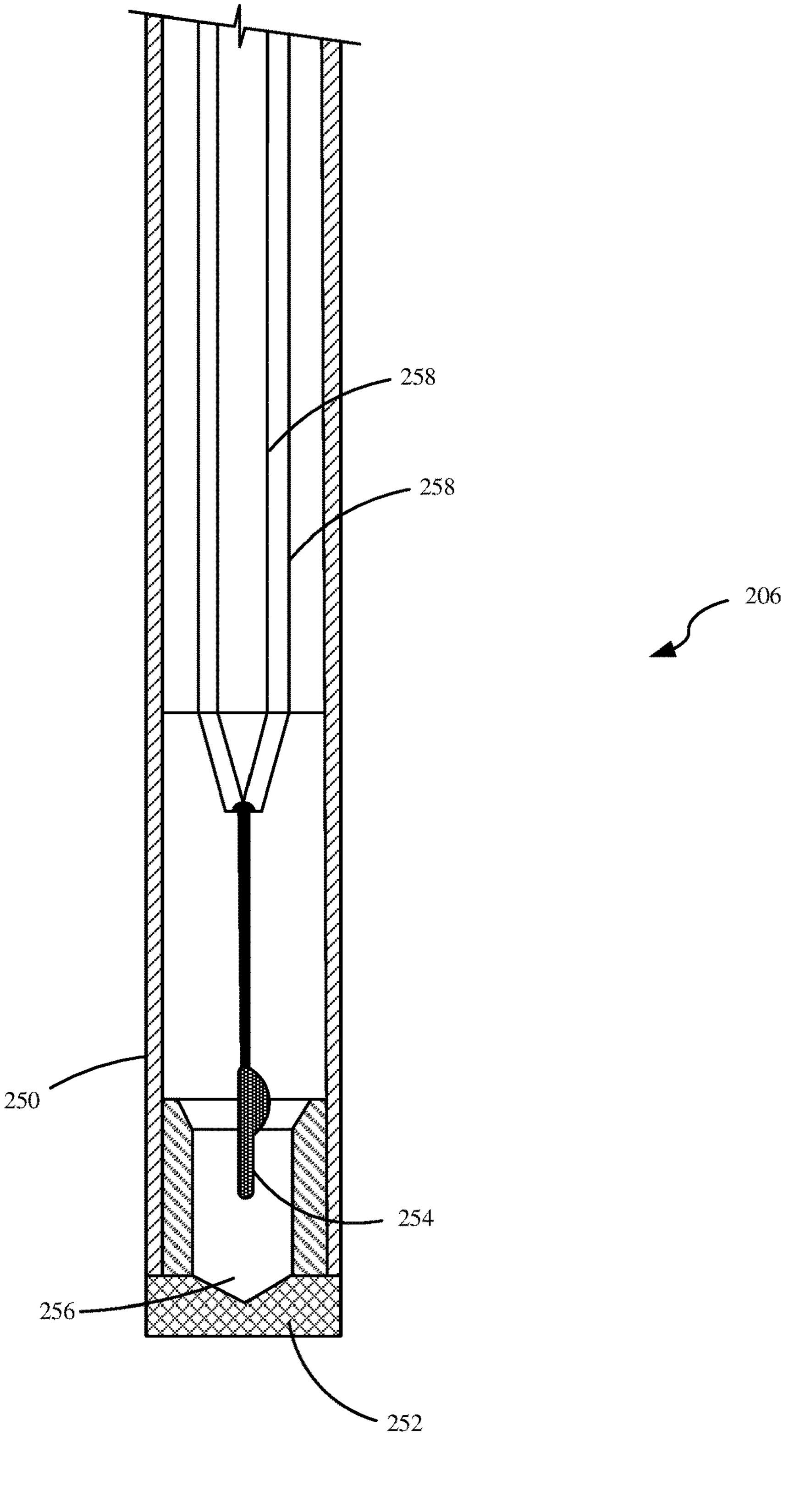
FIG. 3 is a diagrammatic cross-sectional view of a sensor capsule with which embodiments of the present invention are particularly applicable.

FIG. 3 is a diagrammatic view of a sensor capsule with which embodiments of the present invention are particularly applicable. Sensor capsule 206 generally includes a cylindrical side wall 250 with an endcap 252 coupled thereto. In one example, endcap 252 is formed of silver. One or more RTD elements 254 are disposed proximate endcap 252 and are provided in thermal communication with endcap 252 via thermal grease 256. Conductors 258 electrically couple RTD element(s) 254 to measurement circuitry within housing 210. In one embodiment, element 254 is formed in accordance with thin-film RTD technology. Thin-film RTDs are generally considered to be very rugged and generally low cost. A thin-film element is typically manufactured by coating a small ceramic chip with a very thin (such as 0.0001 inch) film of a temperature-sensitive metal (such as platinum) and then laser cutting or chemical or chemical etching a resistance path in the metal film.

Figure 4:
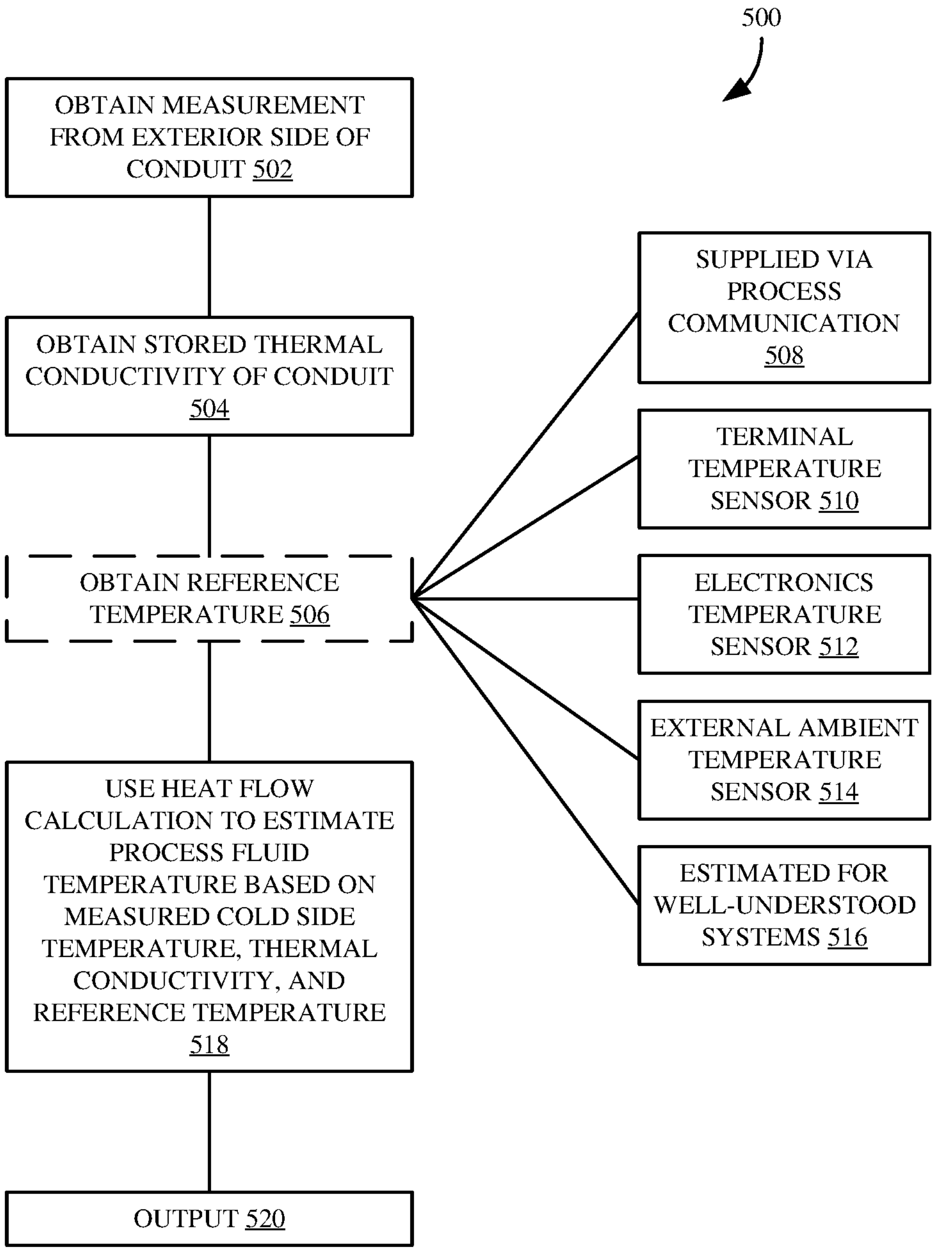
FIG. 4 is a flow diagram of a method of providing a process fluid temperature measurement in a high temperature application in accordance with an embodiment of the present invention.

FIG. 4 is a flow diagram of a method of estimating and providing a process fluid temperature based on heat flow in accordance with an embodiment to the present invention. Method 500 begins at block 502 where a temperature is measured from an external diameter of a process fluid conduit, such as pipe 100. Next, at block 504, a stored thermal conductivity of the conduit is obtained. This step can be preformed by accessing local memory of controller 222 of the system, or by communicating with an external device, such as a process controller, to receive information indicative of the thermal conductivity of the conduit.

Next, at optional block 506, a referenced temperature is obtained. This reference temperature may be obtained in a variety of ways. For example, the reference temperature may be obtained via receiving process communication indicating the reference temperature, as indicated at block 508. Alternately, at block 510, the reference temperature is measured by the system. In one example, this measurement is a temperature measurement at a location within housing 210, such as at a terminal block. As another example, a reference temperature can be obtained via electronics temperature sensors, as indicated by block 512. However, these are only examples and the measurement can be obtained from any location having a relatively fixed thermal relationship with respect to external diameter 116 of process fluid conduit 100. Via this fixed thermal arrangement, the flow of heat from the process fluid conduit to the reference temperature location is fixed and thus follows the heat flow calculation described above.

Additionally, the reference temperature may be obtained by an external ambient temperature sensor, as indicated at block 514. For example, if the process fluid conduit is located within a climate-controlled interior of a facility, the nominal temperature of the climate (such as 70 degrees Fahrenheit) can be used for the reference temperature.

Further, the reference temperature, in well understood systems, may be estimated, as indicated by block 516. For example, learning logic 238 determines a pattern between the skin temperature and another variable, indicative of a relationship to a reference temperature. Then estimation logic 242 uses this pattern to determine a reference temperature.

At block 518, the measured temperature of the conduit skin, thermal conductivity of the conduit, and reference temperature, are applied to a heat flow calculation, such as that set forth above, to calculate an estimate of process fluid temperature. Finally, at block 520, the estimated process fluid temperature is output. In one example, the output is communicated over a process communication loop in accordance with a process communication protocol, such as that set forth above.

Although the present invention has been described with reference to preferred embodiments, workers skilled in the art will recognize that changes may be made in form and detail without departing from the spirit and scope of the invention. For example, while the present invention has been described with respect to diagnostics relative to an internal diameter of a pipe, such diagnostics can be extended to thermowells, less invasive thermowells, external temperatures, and insulated bare capsule sensors. Further, while the present invention has been described with respect to a non-invasive process fluid estimation system, those skilled in the art will appreciate that certain aspects of the present invention are applicable to thermowells, which are considered to be invasive in that they extend into the conduit.

What is claimed is:

1. A process fluid temperature estimation system comprising:

a mounting assembly configured to mount the process fluid temperature estimation system to an external surface of a process fluid conduit having a known thermal conductivity;

a sensor capsule having at least one temperature sensitive element disposed therein, the sensor capsule being disposed to position the at least one temperature sensitive element proximate the external surface of the process fluid conduit;

a terminal temperature sensor;

measurement circuitry coupled to the sensor capsule and the terminal temperature sensor, the measurement circuitry being configured to detect an electrical characteristic of the at least one temperature sensitive element and the terminal temperature sensor that varies with temperature;

a controller coupled to the measurement circuitry, the controller being configured to obtain at least one external surface temperature measurement from the measurement circuitry and to obtain a reference temperature from the terminal temperature sensor and to employ a heat flow calculation with the reference temperature, the external surface temperature measurement, and the known thermal conductivity of the process fluid conduit to generate an estimated process fluid temperature output; and backup logic configured to monitor status of the terminal temperature sensor and selectively provide a second reference temperature measurement from an electronics temperature sensor to the controller.

2. The process fluid temperature estimation system of claim 1, wherein the backup logic is configured to detect a malfunction of the terminal temperature sensor, and automatically provide the second reference temperature measurement to the controller.

3. The process fluid temperature estimation system of claim 1, and further comprising communication circuitry coupled to the controller and configured communicate in accordance with a process communication loop protocol.

4. The process fluid temperature estimation system of claim 3, wherein the communication circuitry is configured to communicate wirelessly.

5. The process fluid temperature estimation system of claim 1, wherein the sensor capsule has an endcap, and at least one temperature sensitive element is thermally coupled to the endcap.

6. A process fluid temperature estimation system comprising:

a mounting assembly configured to mount the process fluid temperature estimation system to an external surface of a process fluid conduit;

a sensor capsule having at least one temperature sensitive element disposed therein;

a terminal temperature sensor;

measurement circuitry coupled to the sensor capsule and configured to detect an electrical characteristic of the at least one temperature sensitive element that varies with temperature and provide sensor capsule temperature information;

communication circuitry configured to receive a reference temperature using process communication;

a controller coupled to the measurement circuitry and configured to employ a heat flow calculation with the reference temperature, the sensor capsule temperature information and the known thermal conductivity of the process fluid conduit to generate an estimated process fluid temperature output; and backup logic configured to monitor status of the reference temperature and selectively provide a second reference temperature measurement to the controller based on a terminal temperature sensor signal.

* * * * *